United States Patent [19]

Divisek et al.

[11] 4,256,549

[45] Mar. 17, 1981

[54] HYBRID PROCESS FOR PRODUCING HYDROGEN

[75] Inventors: Jiri Divisek; Jürgen Mergel, both of Jülich, Fed. Rep. of Germany

[73] Assignee: Kernforschungsanlage Jülich Gesellschaft mit beschränkter Haftung, Jülich, Fed. Rep. of Germany

[21] Appl. No.: 119,107

[22] Filed: Feb. 6, 1980

[30] Foreign Application Priority Data

Feb. 9, 1979 [DE] Fed. Rep. of Germany ....... 2904923

[51] Int. Cl.$^3$ .................................................. C25B 1/02
[52] U.S. Cl. ............................................................ 204/60
[58] Field of Search ............................................. 204/60

[56] References Cited

U.S. PATENT DOCUMENTS 1,543,357  6/1925  Baur ........................................ 204/60

FOREIGN PATENT DOCUMENTS 2557081  7/1977  Fed. Rep. of Germany ............. 204/60

Primary Examiner—Howard S. Williams
Attorney, Agent, or Firm—Becker & Becker, Inc.

[57] ABSTRACT

A method for producing hydrogen according to a hybrid process. A low oxide, which is formed at a high temperature from a higher oxide accompanied by splitting-off of oxygen, is introduced into an aqueous electrolyte and is reoxidized anodically along with simulataneous cathodic hydrogen generation. The oxide is returned into the high temperature range. As an oxide, antimony oxide, especially antimony tetraoxide, is used, with the oxide being formed anodically in a melt-flow electrolysis and being decomposed again into antimony trioxide and oxygen at approximately 850° to 1000° C. As an electrolyte, an alkali melt, and especially a melt having a sodium hydroxide base, may be used. The electrolyte may be formed by a possibly salt, especially sodium fluoride, containing mixture of sodium hydroxide and antimony trioxide in a mole ratio of 1:0.5 to 1:5.0, with a water content of approximately 1 to 5% by weight. The anode chamber is separated from the cathode chamber by a β-aluminum oxide separating wall.

8 Claims, 1 Drawing Figure

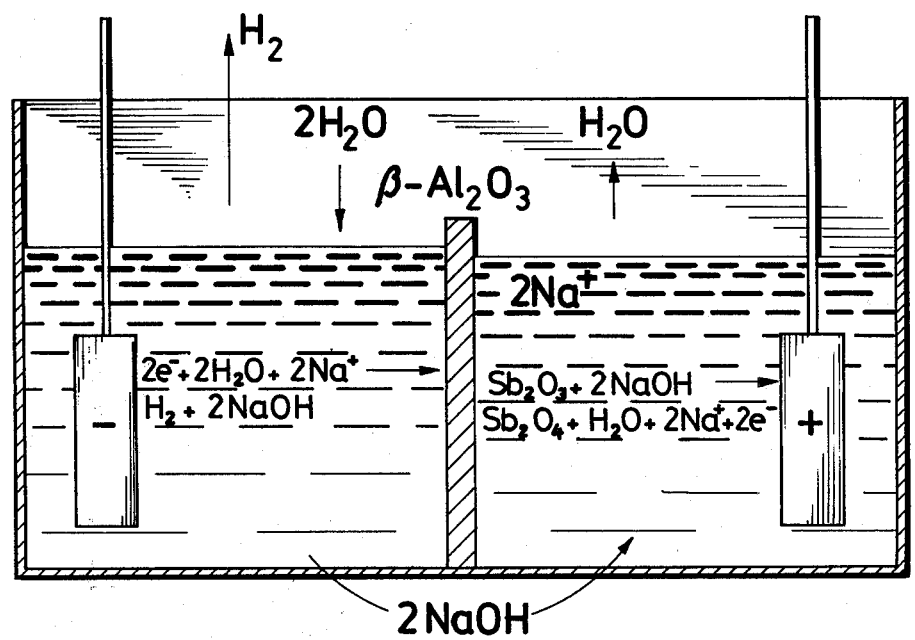

HYBRID PROCESS FOR PRODUCING HYDROGEN

The present invention relates to a method for producing hydrogen according to a hybrid process, with which a low oxide, which is formed at a high temperature from a higher oxide accompanied by splitting-off of oxygen, is introduced into an electrolyte containing water and is anodically oxidized up again along with simultaneous cathodic hydrogen generation; the oxide is then returned into the high temperature range.

The potentially extensive utilization of hydrogen as an energy carrier or as a synthesis-starting material, for example for the hydrogenation of coal, offers a considerable incentive for developing economical methods for producing hydrogen. Accordingly, different concepts have already been made known.

U.S. Pat. No. 3,888,750-Brecher et al, issued June 10, 1975, discloses a method designated as "Sulfuric acid-hybrid-process". Sulfuric acid, generated electrochemically along with simultaneous hydrogen generation, is vaporized according to this known method and is split at high temperature into steam, oxygen, and sulfur dioxide, with the latter being returned again to the electrolysis. With this method, however, considerable difficulties are encountered with the utilization of sulfuric acid at high temperatures, and this has led to currently unresolved material problems.

U.S. Pat. No. 3,842,164-Wentorf, issued Oct. 15, 1974, discloses a method with which iron (III) chloride, at approximately 300° C., along with splitting-off of chloride is converted into iron (II) chloride and is then reacted with steam at approximately 400° C. to produce hydrogen, iron oxide, and hydrochloric acid. The aggressive vapors cause difficulties at higher temperature with this known method, and materials produced or yielded in part in solid form make more difficult the continuous operation due to the necessary solid material transfer.

French Pat. No. 2,035,558 discloses a method designated as "calcium-bromine-mercury-process". Also with this method, with which mercury is reacted with hydrogen bromide or hydrobromic acid along with hydrogen generation to form mercury(II)-bromide, which in turn is reacted with alkaline earth hydroxide to form mercury oxide which again gives off the bound oxygen at elevated temperatures, while the hydrogen bromide or hydrobromic acid is regained by reaction of the calcium bromide with steam, the reaction participants exist extensively in solid aggregate condition, which, as already mentioned, leads to transporting problems.

A "lithium hydride-hybrid-process" method, about which a report was given at the "Second World Hydrogen Conference" in Zürich, Switzerland in August 1978, has the disadvantage that combustible lithium and lithium hydride are involved in the reaction. The direct electrolytic formation of hydrogen and oxygen, starting with water, is likewise known, for a long time, and is not especially economical because of the high consumption of relatively expensive electricity.

It is therefore an object of the present invention to provide a method for producing hydrogen, according to which the materials participating in the reaction are gaseous or liquid, are chemically not too aggressive, and furthermore as little expensive electrical power as possible is required.

This object, and other objects and advantages of the present invention, will appear more clearly from the following specification in connection with the accompanying drawing, in which:

The FIGURE shows a schematic diagram for an electrolytic cell used in a process for producing hydrogen in accordance with the present invention.

The method of the present invention is characterized primarily in that as an oxide an antimony oxide is used, especially antimony tetraoxide, which oxide forms anodically in a melt-flow electrolysis and is decomposed again into antimony trioxide and oxygen at approximately 850° to 1000° C.

Referring now to the drawing and features of the present invention in greater detail, teh following method steps are meaningful:

(a) Accompanied by the supply of electrical energy and water, antimony trioxide ($Sb_2O_3$) is anodically oxidized into antimony tetraoxide or antimony pentoxide by a melt-flow electrolysis according to the entire reaction equation:

$$Sb_2O_3 + H_2O = Sb_2O_4 + H_2$$

or $$Sb_2O_3 + 2\ H_2O = Sb_2O_5 + 2\ H_2.$$

Under these circumstances, cathodic hydrogen is generated. The electrolysis occurs in a temperature range of 250°–500° C.

(b) Subsequently, the antimony tetraoxide ($Sb_2O_4$) formed according to (a) above is thermally converted back again into antimony trioxide ($Sb_2O_3$) at a temperature between 850°–1000° C. while releasing oxygen, according to the following reaction equation:

$$Sb_2O_4 = Sb_2O_3 + 0.5\ O_2\ \text{ps}$$

(Gmelin: Antimony—Volume, Page 374). This reconversion of the oxidized antimony oxide into antimony trioxide occurs (after adequate enrichment of the melt) by transfer into a decomposition zone heated up to 850° to 1000° C., where oxygen is given off as a gas together with a certain amount of sublimated-off antimony trioxide. This sublimated antimony trioxide (in order to preclude the reoxidation of $Sb_2O_3$) is then separated from oxygen by condensation at an elevated temperature of about 750°–800° C. or by being washed out with depleted melt, and is returned to the electrolysis like the melt coming from the decomposition.

The theoretically to be expected electrolysis voltage at 400° C. is approximately 200 mV, and is accordingly considerably less than with direct water electrolysis, which requires a voltage of 1100 mV. The cathode however must be protected against the $Sb_2O_3$-admixture during the electrolysis, since otherwise metallic antimony forms which alloys with and consequently destroys the cathode, such metallic antimony formation occurring according to the reaction equation:

$$3\ H_2O + Sb_2O_3 + 6e^- \rightarrow 2\ Sb + 3\ OH^-$$

or in accordance with the entire equation:

$$4\ Sb_2O_3 = 2\ Sb + 3\ Sb_2O_4$$

It has been shown, however, that the cathode can be effectively protected by a separating wall of solid electrolyte, and in particular $\beta$-Al$_2$O$_3$, the operation of which is schematically shown in FIG. 1.

An alkali melt serves especially as the electrolyte, and this alkali melt can be formed by alkali hydroxide and mixtures thereof, possibly accompanied by the addition of salts such as sulfates, phosphates, carbonates or halides. A sodium hydroxide melt, possibly containing sodium fluoride, with a mole ratio of NaOH to Sb$_2$O$_3$ of 1:0.5 to 1:5 was selected as especially purposeful and effective. The water content of the electrolyte melt has a magnitude of a few weight-percent.

Antimony trioxide is present in the alkali melt at least partially as antimonite (SbO$_2^-$), and is anodically oxidized during the electrolysis into antimonate, the decomposition point of which as NaSbO$_3$ is approximately 1100° C. (W. W. Coffeen: J. Am. Ceram. Soc., 39 (1956) 154). For this reason it is advantageous if the melt also contains other non-alkaline sodium salts, such as phosphate, sulfate, chloride, fluoride, etc., so that neutral Sb$_2$O$_4$, which is decomposable at a lower temperature, can also form, the decomposition of Sb$_2$O$_4$ being capable of being carried out at approximately 850° to 1000° C.

EXAMPLE

A melt containing approximately 2% by weight water and having the composition NaOH: NaF: Sb$_2$O$_3$ in a mole ratio of 1.0:0.5:5.0 was electrolyzed at a temperature of 480° C. A smooth nickel plate served as an anode; the cathode comprised a thin nickel ring. Both electrodes were separated from each other by a $\beta$-Al$_2$O$_3$ tube. This tube defined or limited the Sb$_2$O$_3$-free cathode chamber. The steam was supplied to the cathode chamber. During the electrolysis, anodically antimony tetraoxide Sb$_2$O$_4$ was formed, cathodically the generation of hydrogen was observed. With an entire cell voltage of 760 mV, the attained current density was 10 mA/cm$^2$. Direct water electrolysis in contrast already requires 1100 mV in a current-less condition.

The present invention is, of course, in no way restricted to the specific disclosure of the specification, drawing, or Example, but also encompasses any modifications within the scope of the appended claims.

What we claim is:

1. A method of producing hydrogen by a hybrid process, including the steps of:
   providing a molten salt or fusion electrolyte containing water;
   introducing into said electrolyte a low antimony oxide formed at a high temperature from a higher antimony oxide accompanied by splitting-off of oxygen;
   anodically oxidizing said low antimony oxide in a melt-flow electrolysis, along with simultaneous cathodic generation of hydrogen, to again form said higher antimony oxide; and
   returning said higher antimony oxide to a high temperature region of approximately 850°–1000° C. to decompose same into said low antimony oxide and oxygen.

2. A method according to claim 1, which includes the steps of utilizing antimony tetraoxide as said higher antimony oxide, and decomposing same into antimony trioxide and oxygen.

3. A method according to claim 2, which includes the step of forming said electrolyte by a mixture of sodium hydroxide and antimony trioxide in a mole ratio of 1:0.5 to 1:5.0 with a water content of about 1 to 5% by weight.

4. A method according to claim 3, which includes the step of adding a salt to said electrolyte.

5. A method according to claim 4, which includes the step of adding sodium fluoride to said electrolyte.

6. A method according to claim 1, which includes the step of using an alkali melt as said electrolyte.

7. A method according to claim 6, which includes the step of using a alkali melt having a sodium hydroxide base.

8. A method according to claim 1, which includes the steps of carrying out said process in an electrolysis cell having an anode chamber and a cathode chamber, and providing a $\beta$-aluminum oxide wall to separate said chambers from one another.

* * * * *